United States Patent [19]
Medlin, Jr.

[11] Patent Number: 4,561,615
[45] Date of Patent: Dec. 31, 1985

[54] MOUNTING BRACKET FOR A JUNCTION BOX

[76] Inventor: Lewis B. Medlin, Jr., P.O. Box 237, Blue Ridge, Va. 24064

[21] Appl. No.: 540,384

[22] Filed: Oct. 11, 1983

[51] Int. Cl.⁴ .......................... G12B 9/08; H02G 3/11
[52] U.S. Cl. .......................... 248/27.1; 248/DIG. 6; 248/205.1; 220/3.5
[58] Field of Search ............ 248/DIG. 6, 27.1, 205.1, 248/218.4; 220/3.3, 3.5, 3.9

[56] References Cited

U.S. PATENT DOCUMENTS

| | | | |
|---|---|---|---|
| 1,113,092 | 10/1914 | Beugler | 220/3.5 |
| 1,620,063 | 8/1927 | Bowers . | |
| 1,722,430 | 7/1929 | Kelly . | |
| 1,790,031 | 1/1931 | Vaughn . | |
| 2,180,598 | 11/1939 | Mahan | 220/3.5 |
| 2,439,091 | 4/1948 | Keating | 248/DIG. 6 X |
| 3,146,298 | 8/1964 | Ceglia . | |
| 3,588,019 | 6/1971 | Cozeck . | |
| 3,596,860 | 8/1971 | MacKay . | |
| 3,780,209 | 12/1973 | Schuplin . | |
| 4,135,337 | 1/1979 | Medlin | 52/221 |

Primary Examiner—J. Franklin Foss
Assistant Examiner—K. J. Chotkowski
Attorney, Agent, or Firm—Peck & Peck

[57] ABSTRACT

A mounting bracket for retaining a junction box adjacent to a wall under construction. The mounting bracket includes a laterally extending member having a cutout section removed therefrom. A flange is substantially orthogonally connected to one side of the laterally extending member. At least one ear is operatively connected to the laterally extending member and projects through the cutout section in the same direction as the flange. A slot extends along the ear and is in communication with an insert opening positioned in the laterally extending member adjacent to the cutout section. A junction box, for electrical cables, telephone cables, television cables, or the like, having a positioning screw may be readily inserted through the cutout section with the positioning screw engaging the slot to retain the junction box relative to the mounting bracket.

4 Claims, 7 Drawing Figures

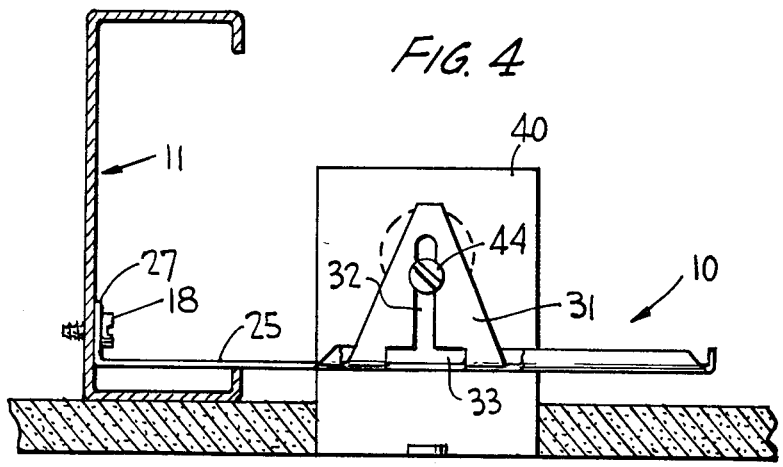
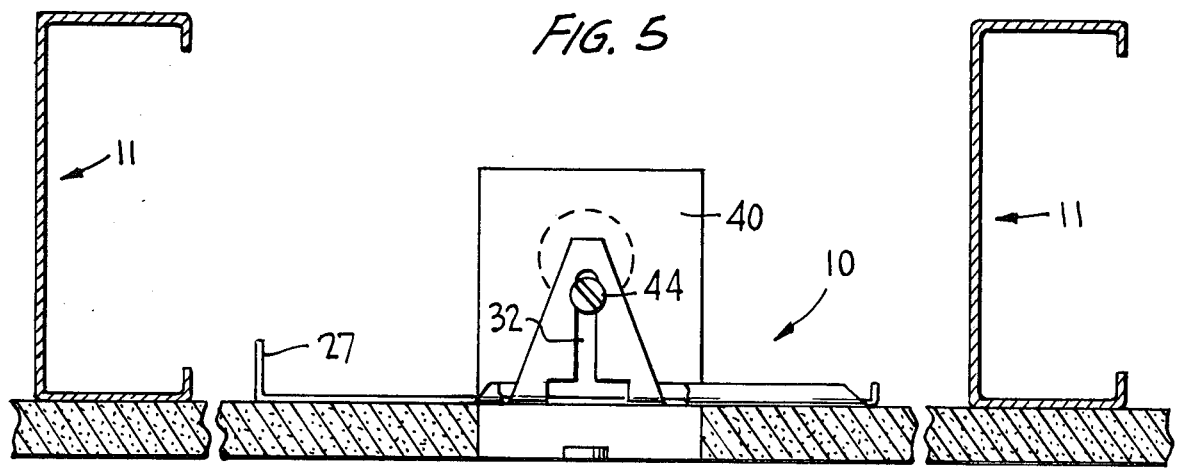
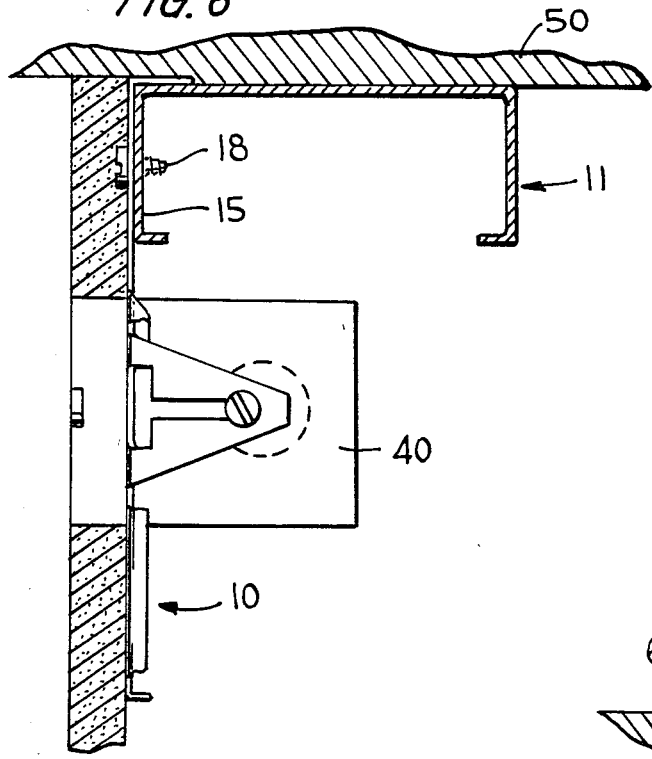
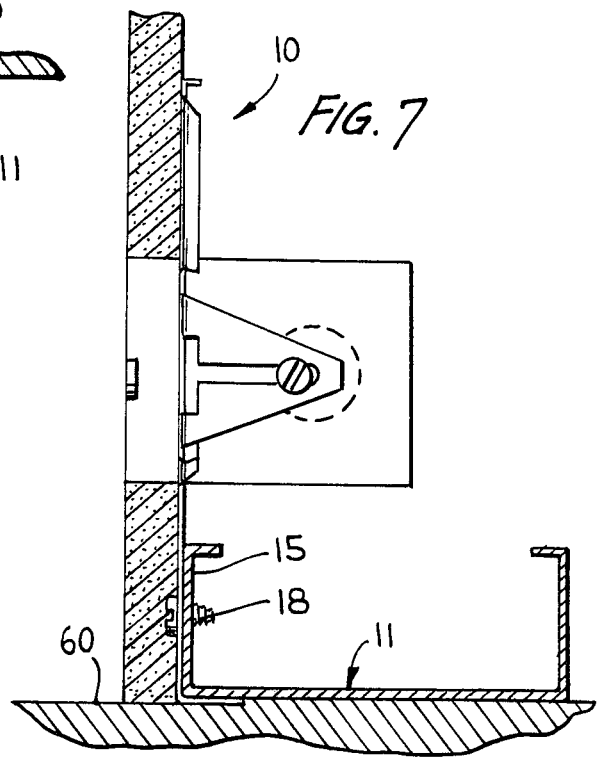

MOUNTING BRACKET FOR A JUNCTION BOX

BACKGROUND OF THE INVENTION

1. Field of the Invention

The present invention is directed to a mounting bracket for positioning a junction box relative to a wall surface under construction.

2. Description of Background Art

Metal studs are currently being used in new building construction which have produced substantial problems with respect to mounting and supporting junction boxes for electrical power lines, telephone lines, and the like relative to the metal studs. Available methods which are used to secure junction boxes to metal studs are extremely time-consuming and therefore expensive. In addition, it is difficult to properly angularly position the junction box with respect to the studs while using conventional mounting brackets.

The Medlin, U.S. Pat. No. 4,135,337, discloses a mounting bracket which clamps onto a metal stud. The mounting bracket 11 includes parallel arms 15, 17 which engage with a metal stud 5 to clamp the bracket 11 relative to the metal stud.

Johnson et al, U.S. Pat. No. 1,705,768, disclose a conventional switch box mounting bracket which is designed to be nailed to a conventional wooden stud. A flat plate 5 includes perpendicular flanges 6, 7 and lugs 8 for affixing an electrical box A relative to the bracket. The box A is affixed prior to the mounting bracket being nailed to the conventional framing.

Pries etal., U.S. Pat. No. 2,917,191, discloses a conventional electrical switch box. The switch box is designed to be inserted through an opening in a wall surface. No mounted bracket is provided for retaining the switch box relative to the opening.

Beugler, U.S. Pat. No. 1,113,092, discloses a switch box which is designed to be affixed to a plate 7. Projections 10 are adapted to receive a screw 11 for affixing the electrical box 5 relative to the plate 7 prior to the electrical box 5 being inserted into an opening in a wall.

SUMMARY AND OBJECTS OF THE INVENTION

It is an object of the present invention to provide a mounting bracket which is designed to be affixed to studding of a wall under construction prior to the junction box being inserted into the mounting bracket.

Anotherobject of the present invention is to provide a mounting bracket which includes a flange for readily positioning the mounting bracket adjacent to metal studding of a wall under construction in a number of various orientations.

A further object of the present invention is to provide a mounting bracket having a cutout section provided therein having ears projecting in the same direction as a flange connected to a laterally extending member for retaining a junction box after the mounting bracket is positioned in a wall under construction.

A further object of the present invention is to provide a mounting bracket which may be readily inserted behind a drywall surface without attaching the mounting bracket to studs supporting the drywall surface.

Another object of the present invention is to provide a mounting bracket which may be readily utilized to support a junction box adjacent to a ceiling or a floor surface.

These and other objects of the present invention are accomplished by providing a mounting bracket having a laterally extending arm with a cutout section removed therefrom. A flange is substantially orthogonally connected to one side of the laterally extending arm. At least one ear is operatively connected to the laterally extending arm and projects through the cutout section in the same direction as the flange. A slot extends along the ear and is in communication with an insert opening positioned adjacent to the cutout section. A junction box including a positioning screw may be readily inserted through the cutout section with the positioning screw engaging the slot to retain the junction box relative to the mounting bracket.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a plan view illustrating the junction box being affixed to an open side of a metal stud;

FIG. 5 is a plan view illustrating the mounting bracket being positioned relative to a drywall surface without being affixed to the metal studding supporting the drywall surface;

FIG. 6 is a cross-sectional view illustrating the mounting bracket being affixed to a metal stud utilized to support a ceiling of a room; and FIG. 7 is a cross-sectional view illustrating the mounting bracket affixed to a metal stud disposed adjacent to a floor surface of a room.

DETAILED DESCRIPTION OF THE INVENTION

Figure 1:
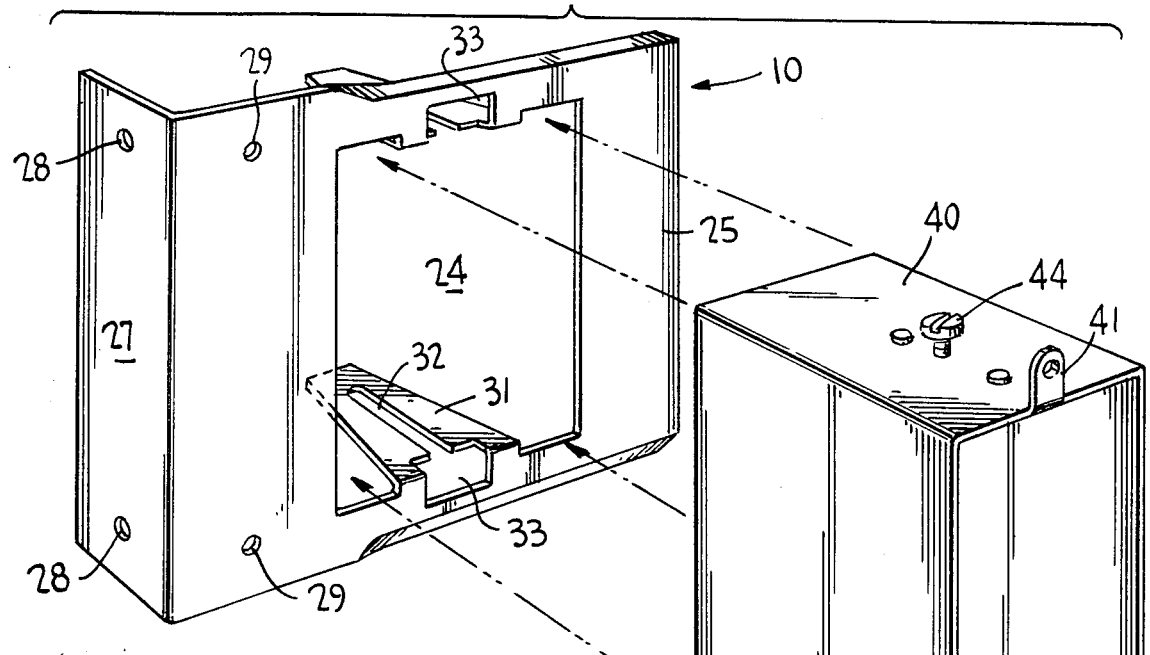
FIG. 1 a exploded perspective view showing the mounting bracket with the junction box being removed therefrom.

Referring to FIG. 1, a mounting bracket 10 is provided which includes a laterally extending member 25 and a substantially orthogonally disposed flange 27. The flange 27 includes holes 28, 28 for affixing the flange relative to framing of a wall under construction. The laterally extending member 25 includes holes 29, 29 for affixing the mounting bracket 10 relative to framing of a wall under construction.

The mounting bracket 10 includes a cutout section 24 substantially centrally disposed therein. The cutout section 24 is adapted to receive a junction box 40 and retain the junction box relative to the mounting bracket. Ears 31 are affixed to and extend from the laterally extending member 25 in the same direction as the flange 27. Slots 32 are provided in each of the ears 31. An insert opening 33 is provided in the laterally extending member 25 adjacent to the cutout section 24. The insert opening 33 is in communication with the slot 32 disposed in each ear 31.

The junction box 40 may be utilized to retain electrical cables, telephone cables, television cables, or other cables which must be retained relative to a wall surface. Positioning screws 44 are provided adjacent to a top and lower surface of the junction box 40. Tabs 41 extend substantially orthogonally with respect to the top surface and the lower surface of the electric junction box 40.

Figure 2:
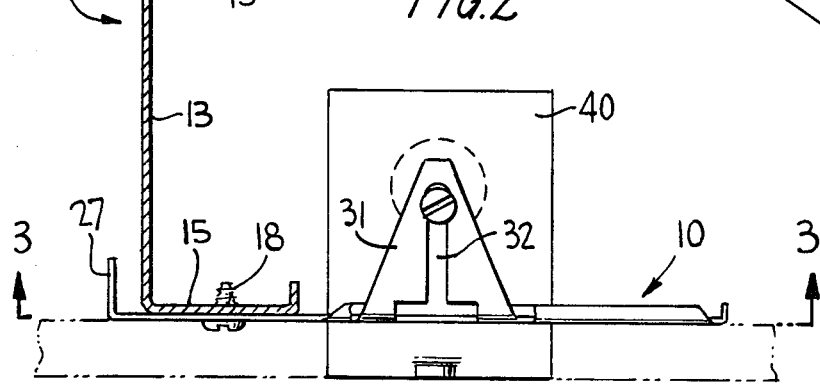
FIG. 2 is a plan view illustrating the junction box being affixed a metal stud.

Referring to FIG. 2, a metal stud 11 includes a web portion 13 and arm portions 15. A bead 17 extends inwardly from the arm portions 15. The channel configuration metal stud 11 is a conventional stud used for new construction. The mounting bracket 10 is designed to be affixed to the metal stud 11. A screw 18 may be inserted through one of the openings 29 in the front surface of the laterally extending member 25 to retain the mounting bracket 10 relative to the metal stud 11. The junction box 40 may thereafter be inserted through the cutout section 24 in the laterally extending member 25. The positioning screws 44 initially pass through the insert openings 33 and thereafter engage with the slot 32 in the ears 31. The ears 31 may be angularly disposed relative to the laterally extending member 25 to frictionally engage the top and lower surfaces of the junction box 40. The positioning screw 44 abuts within the slot 32 and prevents the junction box 40 from slipping through the cutout section 24 into the interior surface of the wall under construction. The slot 32 does not extend along the entire length of the ears 31. In this manner, the junction box 40 is prevented from slipping through the cutout section 24.

Figure 3:
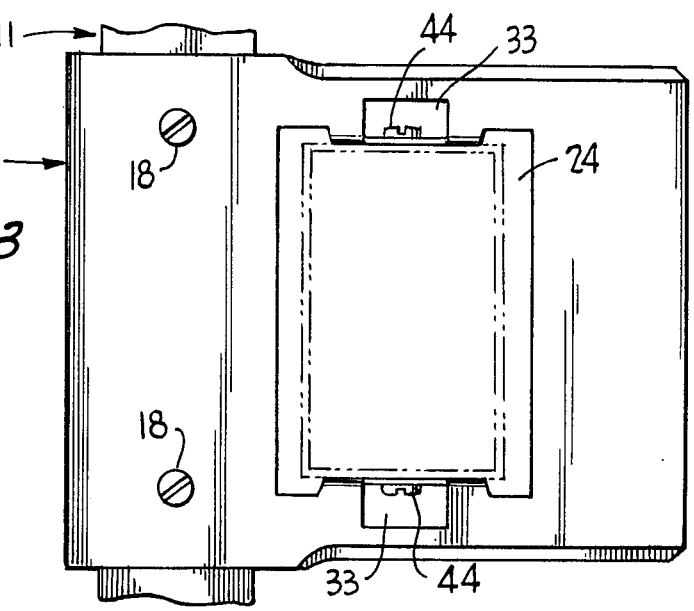
FIG. 3 is a front elevational view showing the mounting bracket being affixed to a vertical stud with the junction box being disposed within a cutout section of the mounting bracket, taken along line 3—3 of FIG. 2.

FIG. 3 is a front view of the mounting bracket 10 taken along line 3—3 as illustrated in FIG. 2. The mounting bracket 10 may be affixed to the metal stud 11 by utilizing two screws 18 which are inserted through the opening 29 in the mounting bracket 10. The junction box 40 is illustrated in broken lines as being positioned within the cutout section 24 with the positioning screws 44 passing through the insert openings 33 and being retained by the slots 32 in the ears 31.

FIG. 4 is a plan view illustrating the mounting bracket 10 being affixed to the open side of the metal stud 11. A screw 18 may be inserted through the hole 28 in the flange portion 27 of the mounting bracket 10. In this manner, the mounting bracket 10 is affixed to the metal stud 11 without utilizing any additional metal tracks or members for retaining the mounting bracket 10 relative to the metal stud 11. The junction box 40 is illustrated with the positioning screw 44 disposed in the slot 32 which is in communication with the insert opening 33.

FIG. 5 is a plan view illustrating the mounting bracket 10 being affixed directly to a wall surface without being attached to a stud. The metal bracket 10 may be glued or otherwise affixed to a conventional wall constructed from drywall. Again, the junction box 40 is illustrated as being positioned within the metal bracket 10 with the positioning screw 44 being engaged in the slot 32.

FIG. 6 is a cross-sectional view illustrating the mounting bracket being affixed to a metal stud 11 for supporting the ceiling 50 of a room under construction. A screw 18 is inserted through the hole 29 in the laterally extending member 25. The screw 18 engages the arm 15 of the metal stud 11. In this manner, the junction box 40 may be positioned extremely close to the ceiling surface of the room.

FIG. 7 is a cross-sectional view illustrating the mounting bracket 10 being affixed to a stud 11 disposed adjacent to the floor surface 60. A screw 18 is positioned through an opening 29 in the laterally extending member 25. The screw 18 affixes the mounting bracket 10 relative to the arm 15 of the metal stud 11.

The present invention provides a mounting bracket 10 which is extremely thin and does not cause a conventional drywall surface to bulge or break off. This problem has occurred with prior art clips which engage the metal studs for retaining a junction box relative thereto. In addition, the mounting bracket 10 of the present invention may be readily affixed to either the web portion 13 or the arm portion 15 of a metal stud 11. Affixing the mounting bracket 10 to the open section of the metal stud 11, is readily accomplished by the present invention.

The mounting bracket 10 may be easily positioned in the exact location desired within a wall under construction. The mounting bracket 10 may be positioned extremely close to the floor or ceiling as compared to prior art mounting brackets. In addition, the mounting bracket 10 may be readily positioned directly to the sheetrock between metal studs without affixing the mounting bracket 10 to either of the metal studs. Although a single gang mounting bracket is illustrated in FIGS. 1-7, the present invention contemplates utilizing multiple gang outlet openings in a single mounting bracket for supporting a plurality of junction boxes relative to metal studs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-piece mounting bracket for a junction box comprising:

a laterally extending flat plate member having a cutout section removed therefrom;

a flange integral with said plate member and substantially orthogonally connected to one side of the plate member;

at least one ear integral with said plate member and projecting through said cutout section with both the ear and the flange being perpendicular to the plane of the plate member;

said ear having inner and other ends with a slot extending axially along said ear and being closed off at the outer end and open at the inner end of the ear;

an insert opening positioned in said plate member at said cutout section and being in open communication with the slot at the inner end of the ear;

whereby a junction box having a positioning screw may be readily inserted through said cutout section with the positioning screw engaging the slot to retain the junction box relative to the mounting bracket.

2. A mounting bracket according to claim 1 wherein said mounting bracket includes two ears carried by said laterally extending plate member in opposed relation at opposite sides of the cutout section and being biased towards each other for frictionally engaging a junction box inserted through said cutout section with its positioning screws in the slots in the ears.

3. A mounting bracket according to claim 1 wherein said laterally extending plate member has holes for retaining said mounting bracket relative to a stud.

4. A mounting bracket according to claim 1 wherein said flange has holes for retaining said mounting bracket relative to a stud.

* * * * *